United States Patent
Talamonti et al.

(10) Patent No.: US 11,924,353 B2
(45) Date of Patent: Mar. 5, 2024

(54) CONTROL INTERFACE FOR AUTONOMOUS VEHICLE

(71) Applicant: Ford Global Technologies, LLC, Dearborn, MI (US)

(72) Inventors: Michael Talamonti, Dearborn, MI (US); Walter Joseph Talamonti, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/415,205

(22) Filed: Jan. 25, 2017

(65) Prior Publication Data

US 2018/0212780 A1 Jul. 26, 2018

(51) Int. Cl.
| | |
|---|---|
| *H04L 29/06* | (2006.01) |
| *H04L 9/32* | (2006.01) |
| *B60W 50/08* | (2020.01) |
| *G05D 1/00* | (2006.01) |

(52) U.S. Cl.
CPC ......... *H04L 9/3247* (2013.01); *B60W 50/082* (2013.01); *G05D 1/0022* (2013.01); *B60W 2540/043* (2020.02); *B60W 2540/215* (2020.02); *G05D 2201/0213* (2013.01); *H04L 2209/84* (2013.01)

(58) Field of Classification Search
CPC . H04L 9/3247; H04L 9/14; H04L 9/30; H04L 2209/84; B60W 50/082; B60W 2540/28; G05D 2201/0213
See application file for complete search history.

(56) References Cited

U.S. PATENT DOCUMENTS

| | | | |
|---|---|---|---|
| 7,549,046 B2 | 6/2009 | Fehr et al. | |
| 9,348,334 B2 | 5/2016 | McGinn et al. | |
| 9,963,106 B1* | 5/2018 | Ricci | B60R 25/2018 |
| 2004/0003227 A1* | 1/2004 | Reinold | H04L 9/40 |
| | | | 713/155 |
| 2010/0036546 A1* | 2/2010 | Gomes | B60R 25/257 |
| | | | 701/1 |
| 2010/0073125 A1* | 3/2010 | Alrabady | H04L 9/3247 |
| | | | 340/5.2 |
| 2011/0083161 A1 | 4/2011 | Ishida et al. | |

(Continued)

FOREIGN PATENT DOCUMENTS

| | | |
|---|---|---|
| DE | 102014219638 A1 | 3/2016 |
| GB | 2532566 A1 | 5/2016 |
| JP | 5393500 B2 | 10/2013 |

OTHER PUBLICATIONS

Search Report from United Kingdom Intellectual Property Office dated Jul. 17, 2018 regarding GB Application No. GB1801030.6 (4 pages).

(Continued)

*Primary Examiner* — Rodman Alexander Mahmoudi
(74) *Attorney, Agent, or Firm* — Frank A. MacKenzie; Bejin Bieneman PLC

(57) ABSTRACT

A system includes a control computer that is programmed to perform an authentication based on an encryption key, upon being connected to a vehicle communication network. The computer is programmed to control vehicle operation including at least one of propulsion, braking, and steering, upon authentication by a vehicle computer that is physically attached to the communication network.

12 Claims, 5 Drawing Sheets

(56) References Cited

U.S. PATENT DOCUMENTS

| | | | |
|---|---|---|---|
| 2012/0313796 A1* | 12/2012 | Lee | B60Q 1/52 |
| | | | 701/2 |
| 2014/0333425 A1* | 11/2014 | Giraud | G07C 5/008 |
| | | | 340/438 |
| 2016/0148450 A1 | 5/2016 | Ohshima | |
| 2018/0012433 A1* | 1/2018 | Ricci | B60L 53/65 |
| 2018/0013211 A1* | 1/2018 | Ricci | B60L 11/1822 |
| 2018/0218619 A1* | 8/2018 | Brown | G08G 5/0034 |

OTHER PUBLICATIONS

Williams, Martyn, "You drive this Lincoln with a game controller," "Autonomous driving technology interfaces with the car's existing computer," Jan. 2, 2016.

* cited by examiner

CONTROL INTERFACE FOR AUTONOMOUS VEHICLE

BACKGROUND

A vehicle may operate wholly or at least partially without a user intervention. Such a vehicle is sometimes referred to as an autonomous or self-driving vehicle. For example, a vehicle computer may control one or more vehicle operations such as steering, braking, powertrain, etc. Thus, an autonomous vehicle may lack a vehicle steering wheel, a brake pedal, etc. However, in some cases such as repair, maintenance, etc., a manual control of vehicle operation may be necessary. Thus, an external device may be used to manually control at least part of a vehicle operation.

DETAILED DESCRIPTION

Introduction

Disclosed herein is a system includes a control computer that is programmed to perform an authentication based on a key received from an encryption token, upon being connected to a vehicle communication network. The computer is programmed to control vehicle operation including at least one of propulsion, braking, and steering, upon authentication by a vehicle computer that is permanently and physically attached to the communication network.

Exemplary System Elements

Figure 1:
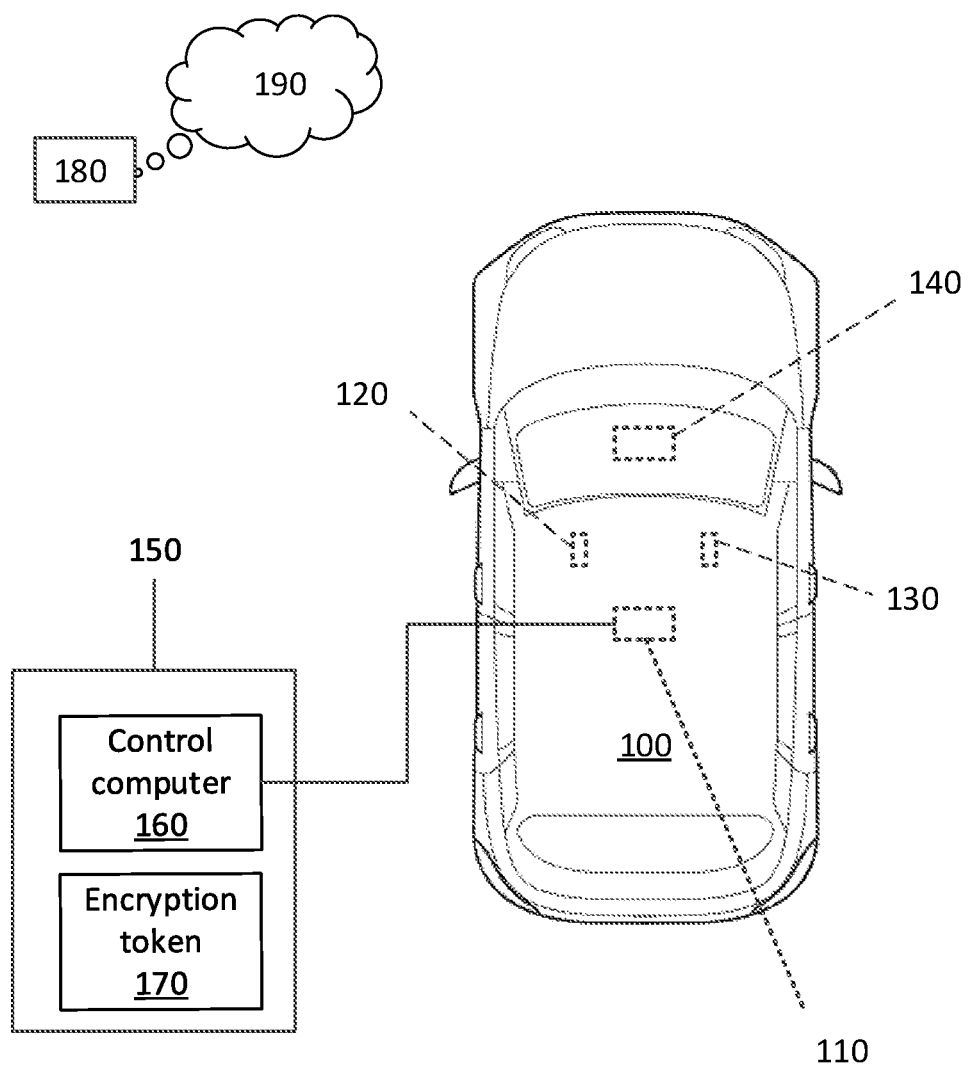
FIG. 1 is a diagram showing an example vehicle and an example control computer connected to a vehicle computer.

FIG. 1 shows an example vehicle 100, a control device 150, and a remote computer 180. The vehicle 100 may be powered in variety of known ways, e.g., with an electric motor and/or internal combustion engine. The vehicle 100 includes the computer 110, actuator(s) 120, sensor(s) 130, a user interface device 140, and other components such as discussed herein below.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous, semi-autonomous, or non-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering; in a non-autonomous mode, a vehicle 100 user controls vehicle 100 propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus as described further below, more than one other computing devices, e.g., controllers or the like included in the vehicle for monitoring and/or controlling various vehicle components, e.g., controllers can include electronic control units (ECUs) such as a powertrain controller, a brake controller, a steering controller, etc. The computer 110 is generally arranged for communications on a vehicle communication network such as a controller area network (CAN) or the like.

Via the vehicle 100 network, the computer 110 may transmit messages to various devices in the vehicle 100 and/or receive messages from the various devices, e.g., controllers, actuators 120, sensors 130, etc. Alternatively or additionally, in cases where the computer 110 actually comprises multiple devices, the vehicle communication network may be used for communications between devices represented as the computer 110 in this disclosure. Further, as mentioned below, various controllers and/or sensors 130 may provide data to the computer 110 via the vehicle communication network. Additionally, via the vehicle 100 communication network the computer 110 may transmit messages to an external control device 150 and/or receive messages from the external control device 150, e.g., via a wired and/or a wireless connection between the control device 150 and a vehicle 100 communication interface.

In addition, the computer 110 may be configured for communicating through a vehicle-to-infrastructure (V-to-I) interface with a remote computer 180 via a network 190. The network 190 represents one or more mechanisms by which the computer 110 and the remote computer 180 may communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks (e.g., using one or more of cellular, Bluetooth, IEEE 802.11, etc.), dedicated short range communications (DSRC), local area networks (LAN) and/or wide area networks (WAN), including the Internet, providing data communication services.

As already mentioned, generally included in instructions stored in the memory and executed by the computer 110 is programming for operating one or more vehicle 100 components, e.g., braking, steering, propulsion, etc., without intervention of a human operator. Using data received in the computer 110, e.g., the sensor data from the sensors 130, etc., the computer 110 may make various determinations and/or control various vehicle components and/or operations without a driver to operate the vehicle. For example, the computer 110 may include programming to regulate vehicle operational behaviors such as speed, acceleration, deceleration, steering, etc., as well as tactical behaviors such as a distance between vehicles and/or amount of time between vehicles, lane-change minimum gap between vehicles, left-turn-across-path minimum, time-to-arrival at a particular location, intersection (without signal) minimum time-to-arrival to cross the intersection, etc.

The sensors 130 may include a variety of devices known to provide data via the vehicle communications bus. For example, the sensors 130 may include one or more camera sensors 130, etc. being disposed in the vehicle 100 providing data encompassing at least some of the vehicle interior and/or exterior. The data may be received by the computer 110 through any suitable interface.

The actuators 120 are a variety of known devices implemented via circuits, chips, or other electronic components that can actuate various vehicle subsystems in accordance with appropriate control signals as is known. The actuators 120, therefore, may be used to control braking, acceleration, and steering of the vehicle 100.

The user interface device 140 can include a touch screen, an interactive voice response (IVR) system, and/or other input/output mechanisms such as are known, and can receive input data from a user and/or outputs data to the user. For example, the user interface device 140 may have a touch screen to enter an access code and/or modifying a vehicle 100 configuration, e.g., changing a vehicle 100 mode of operation to a non-autonomous mode. In one example, the user interface device 140 is disposed in a vehicle 100 interior and mounted to a vehicle 100 instrument panel.

The remote computer 180 is a remote computer or computers communicating with the computer 110 via the network 190, e.g., a wireless communication network such as Long-Term Evolution (LTE), and/or a wired communication network such as Ethernet.

As mentioned above, the vehicle 100 computer 110 may control the vehicle 100 operation including at least one of propulsion, braking, and steering, e.g., in an autonomous or semi-autonomous mode. However, for various reasons such as maintenance, repair, etc., of the vehicle 100, a user may control at least part of the vehicle 100 operation such as a vehicle 100 steering, via the control device 150, e.g., a handheld apparatus including button(s), a touch screen, a lever, etc. The control device 150 may communicate with the vehicle 100 communication network via a wired and/or wireless communication interface.

The control device 150 may include a control computer 160. The control computer 160 includes a processor and a memory such as are known. The memory includes one or more forms of computer-readable media, and stores instructions executable by the computer 160 for performing various operations, including as disclosed herein. For example, the control computer 160 may send a message including a command to actuate, e.g., a vehicle 100 brake actuator 120.

In one example, to prevent an intruder computer from controlling a vehicle 100 operation, the vehicle 100 computer 110 may be programmed to authenticate a control computer 160 that requests to access the vehicle 100 computer 110 and control a vehicle 100 operation. The control computer 160 may be programmed to perform an authentication based on a key, e.g., a combination of numbers and/or characters, received from a control device 150 encryption token 170, upon being connected to a vehicle 100 communication network. The control computer 160 may be programmed to control a vehicle 100 operation including at least one of propulsion, braking, and steering, upon authentication by a vehicle 100 computer 110 that is permanently and physically attached to the communication network. "Permanently and physically" in the context of the present disclosure means mounted to the vehicle 100 during vehicle 100 manufacturing, e.g., coupled mechanically via screws, clips, etc. with a vehicle 100 body component, and possibly also electrically coupled to other vehicle 100 electrical component(s) via a vehicle 100 electrical wiring. Thus, the vehicle 100 computer 110 may prevent that an intruder computer from pretending to be, i.e., impersonating, a control computer 160 of an authorized control device 150 to control the vehicle 100 operation. In one example, an authorized control device 150 may include device(s) manufactured by a vehicle 100 manufacturer or an approved third party device. Additionally, the vehicle 100 computer 110 and a control computer 160 may use techniques such as encryption to achieve secure and confidential communications with one another.

In another example, the vehicle 100 computer 110 may be programmed to receive, from a vehicle 100 user interface device 140, a request including an access code, e.g., a secret code known to certain parties such as vehicle distributors, e.g., dealers, for activating a vehicle 100 non-autonomous mode. The vehicle 100 computer 110 may activate the vehicle 100 non-autonomous mode upon determining that the received access code matches an expected access code, e.g., based on stored information in the vehicle 100 computer 110.

In one example, if the vehicle 100 computer 110 determines that the received access code matches an expected access code, then the vehicle 100 computer 110 may activate a vehicle 100 non-autonomous mode. For example, the vehicle 100 computer 110 may be programmed to control the vehicle 100 operation based on commands received from the control computer 160. In another example, the vehicle 100 computer 110 may additionally authenticate the control computer 160 after the access code is verified. Alternatively, the vehicle 100 computer 110 may be programmed to first authenticate the control computer 160 and then proceed to verify the access code before activating a vehicle 100 non-autonomous mode.

Encryption, as is known, is a technique for converting information from a comprehensible state to an incomprehensible state. The originator and an intended receiver of an encrypted message, e.g., the control computer 160 and the vehicle 100 computer 110, may share a decryption (converting to the original comprehensible state) technique, e.g., including a shared key or the like, needed to recover the original comprehensible information. The originator and the intended receiver thereby preclude an unwanted party such as an intruder computer from decrypting the information. Various known techniques such as RSA (Rivest, Shamir, and Adleman) may be used to provide an encrypted communication between two parties, e.g. the control computer 160 and the vehicle 100 computer 110. For example, in an RSA-based encryption, an encryption key for communicating with an intended receiving party is known to anyone. However, only the intended receiving party has access to a decryption key that enables a decryption of a message that is encrypted based on the encryption key.

Authentication of a digital communication or message as discussed herein mean implementing a scheme for determining an authenticity (or lack thereof) of the communication or message, e.g., a message from control computer 160 to the vehicle 100 computer 110 requesting a brake operation. In contrast with identification, which refers to an act of stating or otherwise indicating an identity, e.g., a sent message from the control computer 160 including an identifier of a known control device 150, authentication includes confirming that identity. In contrast with encryption, which refers to securing a communication between two parties from a third party, authentication includes confirming that the received message was created by a known sender rather than any other party. Various known techniques such as an authentication signature (or digital signature) may be used for authentication. A valid authentication signature included in a received message may give the vehicle 100 computer 110 a reason to conclude that the message was created by a known sender, e.g., a known control device 150.

For example, the control computer 160 may be programmed to perform the authentication by sending a message including an authentication signature to the vehicle 100 computer 110. The authentication signature may be based on data, known to both parties, e.g., an identifier of a sender, a local time, etc., and/or a key received from a control device 150 encryption token 170. Thus, a receiver can verify the authentication signature based on the encryption key, the decryption key, and/or the known data such as the control computer 160 identifier.

The vehicle 100 computer 110 may be programmed to receive a message sent from the control computer 160 and authenticate the control computer 160 based on the authentication signature. In one example, the vehicle 100 computer 110 may be programmed to authenticate the control computer 160 based on data stored in the vehicle 100 computer 110 or otherwise accessible by the vehicle 100 computer 110. For example, the vehicle 100 computer 110 may authenticate the control computer 160 by determining whether the authentication signature is included in a list of valid authentication signatures stored in the vehicle 100 computer 110 or a memory accessible by the vehicle 100 computer 110. In another example, the vehicle 100 computer 110 may determine an expected signature for the respective control device 150, e.g., a combination of an identifier of the known control device 150 and current time, and verify whether the authentication signature of the received message includes the expected signature. In another example, the vehicle 100 computer 110 may determine the expected signature based on a result of an operation, e.g., multiplication, of a control device 150 identifier, current time, etc. In other words, the vehicle 100 computer 110 may be aware of how the control computer 160 determines its authentication signature.

In another example, to prevent impersonation and to achieve confidentiality, techniques may be used which include both encryption of a message and authentication of a message sender. In other words, an intended receiver of such a message may not only have a confidential communication with the sender but also can authenticate the sender. For example, the control computer 160 may be programmed to perform the authentication by encrypting the message based on the key received from the control device 150 encryption token 170. In other words, a control computer 160 may encrypt an entire message based on the key that is based on data such as a current time, a unique identifier for each control computer 160 such a serial number, a vehicle 100 identifier, etc. Thus, a message received by the vehicle 100 computer 110 may be encrypted based on an encryption key that is at least partially dependent on data specific to a respective sender, e.g., an identifier, a serial number, etc.

In one example, an encryption token 170 of the control device 150 may generate the key based on data and a function known to both the encryption token 170 and the vehicle 100 computer 110. For example, the known data may include information such as a current time, an identifier of the control computer 110, a number selected from a list of known numbers, etc. A function may include at least a method of generating an encryption key based on the know data such as a current time, etc. A function may include an operation, e.g., a mathematical operation such as multiplication, division, etc., to generate the encryption key. The receiver, e.g., the vehicle 100 computer 110, may have access to the known data and/or the function to generate a decryption key that can be used to convert the received message to a comprehensible message.

Thus, encryption and decryption may be at least in part based on information generated by an encryption token 170 of the control device 150. Therefore, the vehicle 100 computer 110 may be able to authenticate an identification of the control device 150. For example, the vehicle 100 computer 110 may be programmed to decrypt the received encrypted message based on a decryption key generated by the vehicle 100 computer 110. Additionally, the vehicle 100 computer 110 may be programmed to decrypt an authentication signature included in the received message and authenticate the sender based on the decrypted authentication signature. An encryption token 170 may be implemented in form of electronic components such as a chip and/or a program executable on, e.g., a processor included in the control computer 160.

In another example, a three-party authentication and/or encryption mechanism may be used. For example, a control computer 160 and a vehicle 100 computer 110 may determine the keys and/or an authentication signature at least partially based on information received from a third party, e.g., a remote computer 180. In other words, a control computer 160 and the vehicle 100 computer 110 may not only rely on information known to the vehicle 100 computer 110 and the respective control computer 160 but also on information received from a third party, e.g., the remote computer 180.

In one example, the control computer 160 may be programmed to perform the authentication by sending a message including, e.g., a control computer 160 identifier, an identifier of the vehicle 100, and/or the key generated by the control computer 160 encryption token 170, to the remote computer 180. The control computer 160 may then receive a temporary authentication signature from the remote computer 180 based at least in part on the sent message. The temporary authentication signature may be generated by the remote computer 180 based on the received information and/or data only known to the remote computer 180, e.g., a random number generator.

In another example, the temporary authentication signature is generated based at least in part on one of a vehicle 100 identification number, a current time, and a control computer 160 identifier. The control computer 160 may send an authentication request to the vehicle 100 computer 110 at least in part based on the temporary authentication signature. Because the received message at least partially depends on the information received from a third party, e.g., the remote computer 180, the vehicle 100 computer 110 may need information from the remote computer 180 to comprehend the received message. In one example, the vehicle 100 computer 110 may be programmed to receive data associated with the temporary authentication signature from the remote computer 180. For example, the remote computer 180 may send data to the vehicle 100 computer 110 that enables the vehicle 100 computer 110 to determine the temporary authentication signature. The vehicle 100 computer 110 may determine the temporary authentication signature based on the received data and other data known to the vehicle 100 computer 110 such as the vehicle 100 identifier. The vehicle 100 computer 110 can authenticate the control computer 160 based at least in part on the received data. In another example, a communication between the remote computer 180 and the vehicle 100 computer 110, and/or a communication between the remote computer 180 and the control computer 160 may be encrypted. For example, the remote computer 180 may send messages to the vehicle 100 computer 110 that are encrypted with an encryption key (or so called public key) associated with the vehicle 100 computer 110. The vehicle 100 computer 110 may decrypt the received messages based on a decryption key (or so called secret key) associated with the public key, known to the vehicle 100 computer 110 only.

Processing

Figure 2:
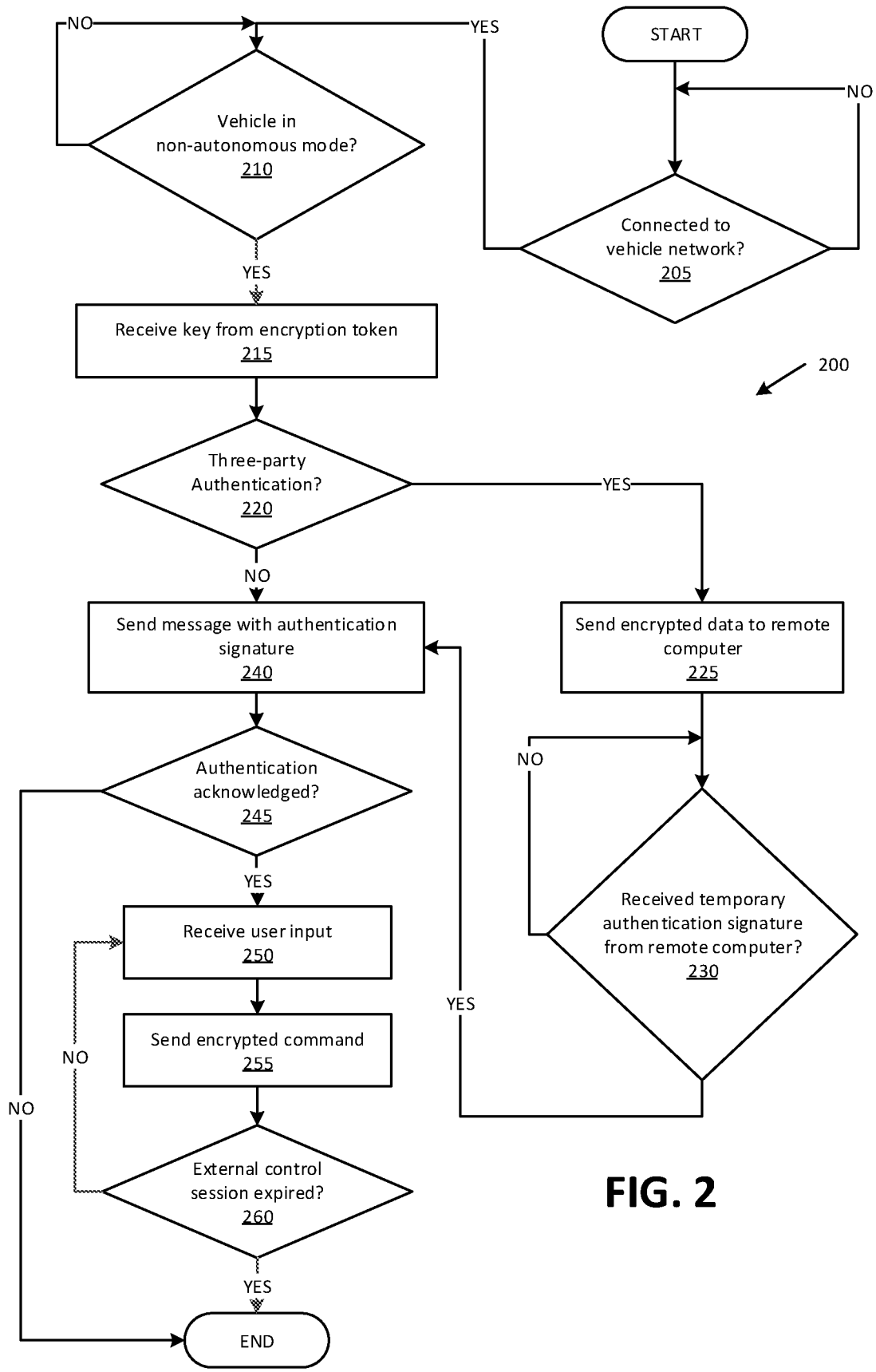
FIG. 2 is a flowchart of an exemplary process for the control computer of FIG. 1 to control the vehicle.

FIG. 2 is a flowchart of an exemplary process 200 for the control computer 160 to control the vehicle 100. In one example, a control device 150 control computer 160 may be programmed to execute steps of the process 200.

The process 200 begins in a decision block 205, in which the control computer 160 determines whether the control computer 160 is connected to a vehicle communication network, e.g., CAN, Ethernet, a wireless network, etc. For example, the control computer 160 may determine that the control computer 160 is connected to a vehicle communication network based on observing data traffic on a vehicle CAN or other communication bus, e.g., messages exchanged between ECUs in the vehicle 100. If the control computer 160 determines that control computer 160 is connected to a vehicle 100 communication network, then the process 200 proceeds to a decision block 210; otherwise the process 200 returns to the decision block 205.

In the decision block 210, the control computer 160 determines whether the vehicle 100 is operating in a non-autonomous mode. For example, the control computer 160 may receive a message from the vehicle 100 computer 110 indicating that the vehicle 100 is operating in a non-autonomous mode. If the control computer 160 determines that the vehicle 100 is operating in a non-autonomous mode, the process 200 proceeds to a block 215; otherwise the process 200 returns to the decision block 210.

In the block 215, the control computer 160 receives a key from the encryption token 170, e.g., an encryption key based on a control computer 160 identifier, current time, a list of numbers, etc.

Next, in a decision block 220, the control computer 160 determines whether a three-party authentication may be used for communication with a vehicle 100 computer 110. In one example, the control computer 160 may receive a message from the vehicle 100 computer 110 indicating whether the vehicle 100 computer 110 uses a three party authentication. If the control computer 160 determines that the vehicle 100 computer 110 uses three party authentication, then the process 200 proceeds to a block 225; otherwise the process 200 proceeds to a block 240.

In the block 225, the control computer 160 sends a message including data including, in one example, the generated key, a control computer 160 identifier, and an identifier of the vehicle 100 to a remote computer 180. The sent message may be encrypted based on a public key of the remote computer 180.

Next, in a decision block 230, the control computer 160 determines whether a temporary authentication signature is received from the remote computer 180. Additionally or alternatively, the control computer 160 may receive data from the remote computer 180 and generate a new key based on the received data from the remote computer 180. If the control computer 160 receives the temporary authentication signature, then the process 200 proceeds to the block 240; otherwise the process returns to the decision block 230.

In the block 240, the control computer 160 sends a message with an authentication signature to the vehicle 100 computer 110. For example, when the block 240 is reached from the decision block 220, the control computer 160 sends a message including an authentication signature, e.g., selected from a list of authentication signatures known to the control computer 110 and the vehicle 100 computer 110. In another example, when the block 240 is reached from the decision block 230, the control computer 160 may send a message including the temporary authentication signature. Additionally or alternatively, the control computer 160 may encrypt the message based on data received from the remote computer 180.

Next, in a decision block 245, the control computer 160 determines whether authentication of the control computer 160 is acknowledged by the vehicle 100 computer 110. For example, the control computer 160 may receive a message from the vehicle 100 computer 110 indicating that the vehicle 100 computer 110 acknowledges the authentication of the control computer 160 and/or accepts instructions from the control computer 160 to control the vehicle 100 operation. If the control computer 160 determines that the vehicle 100 computer 110 acknowledged the authentication, then the process 200 proceeds to a block 250; otherwise the process 200 ends, or alternatively, the process 200 may return to the block 215, although not shown in FIG. 2.

In the block 250, the control computer 160 receives user input from, e.g., control device 150 user interfaces such as push button, lever, etc. For example, a user input may include data associated with pressing a brake push-button. In one example, the control computer 160 may be programmed to associate an amount of pressure applied by a user on the brake push-button to a brake pressure, e.g. 500 kilopascal (kPa), such as is known as brake-by-wire.

Next, in a block 255, the control computer 160 sends an encrypted command to the vehicle 100 computer 110, e.g., indicating that the vehicle 100 brake actuator 120 may apply a brake pressure of 500 kPa. Additionally, the control computer 160 may include an authentication signature in each command sent to the vehicle 100 computer 110.

Next, in a decision block 260, the control computer 160 determines whether a control session expired. "Control session," in the context of this disclosure, refers to a time starting from a request for control sent to the vehicle 100 computer 110 until, due to any reason, control of the vehicle 100 operation ends. For example, a control session may end due to a disconnection of control computer 160 from the vehicle 100 network. If the control computer 160 determines that the control session is ended, then the process 200 ends; otherwise the process 200 returns to the block 250.

Figure 3A:
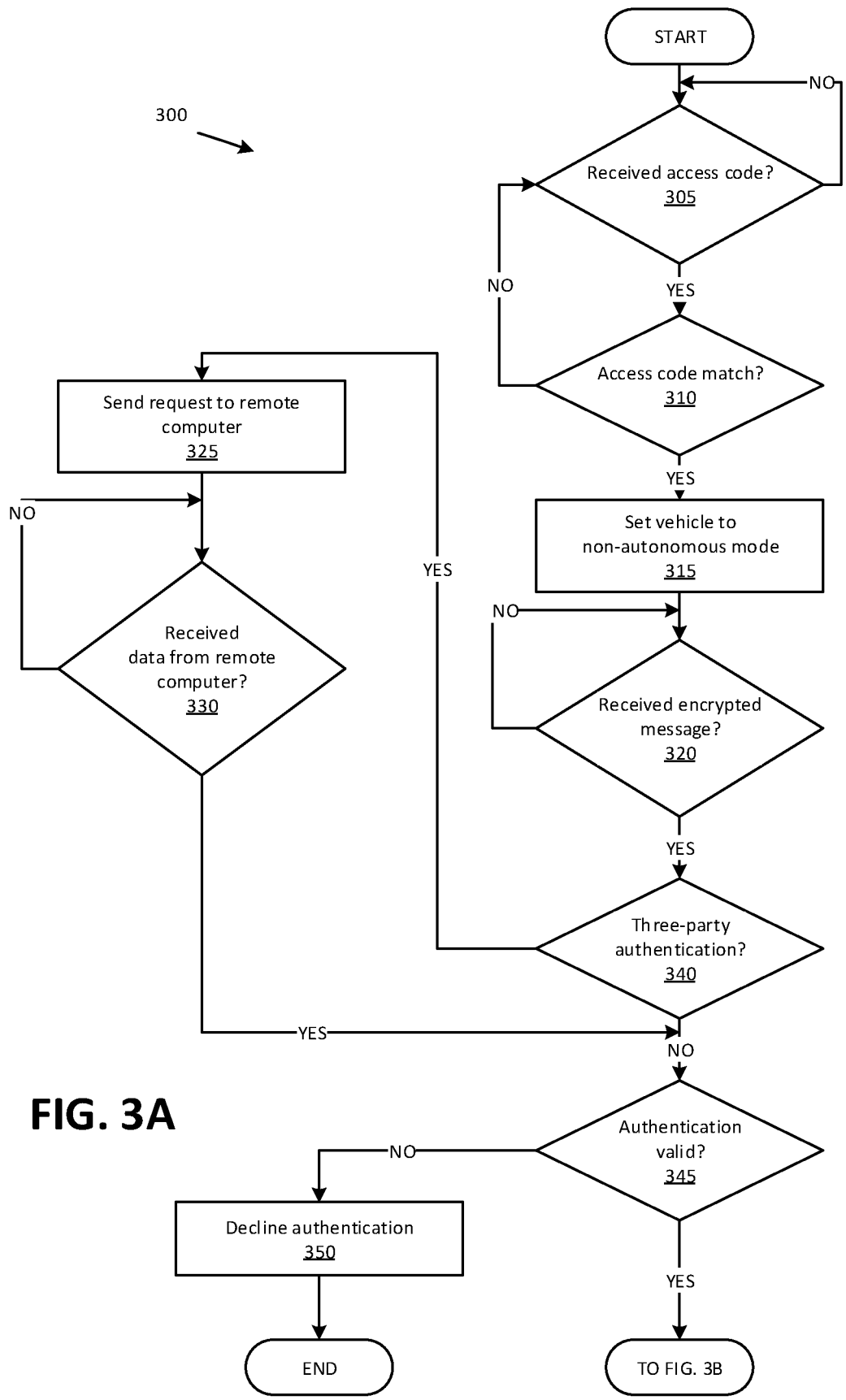
FIGS. 3A-3B include a flowchart of an exemplary process for the vehicle computer to authenticate the control computer.
Figure 3B:
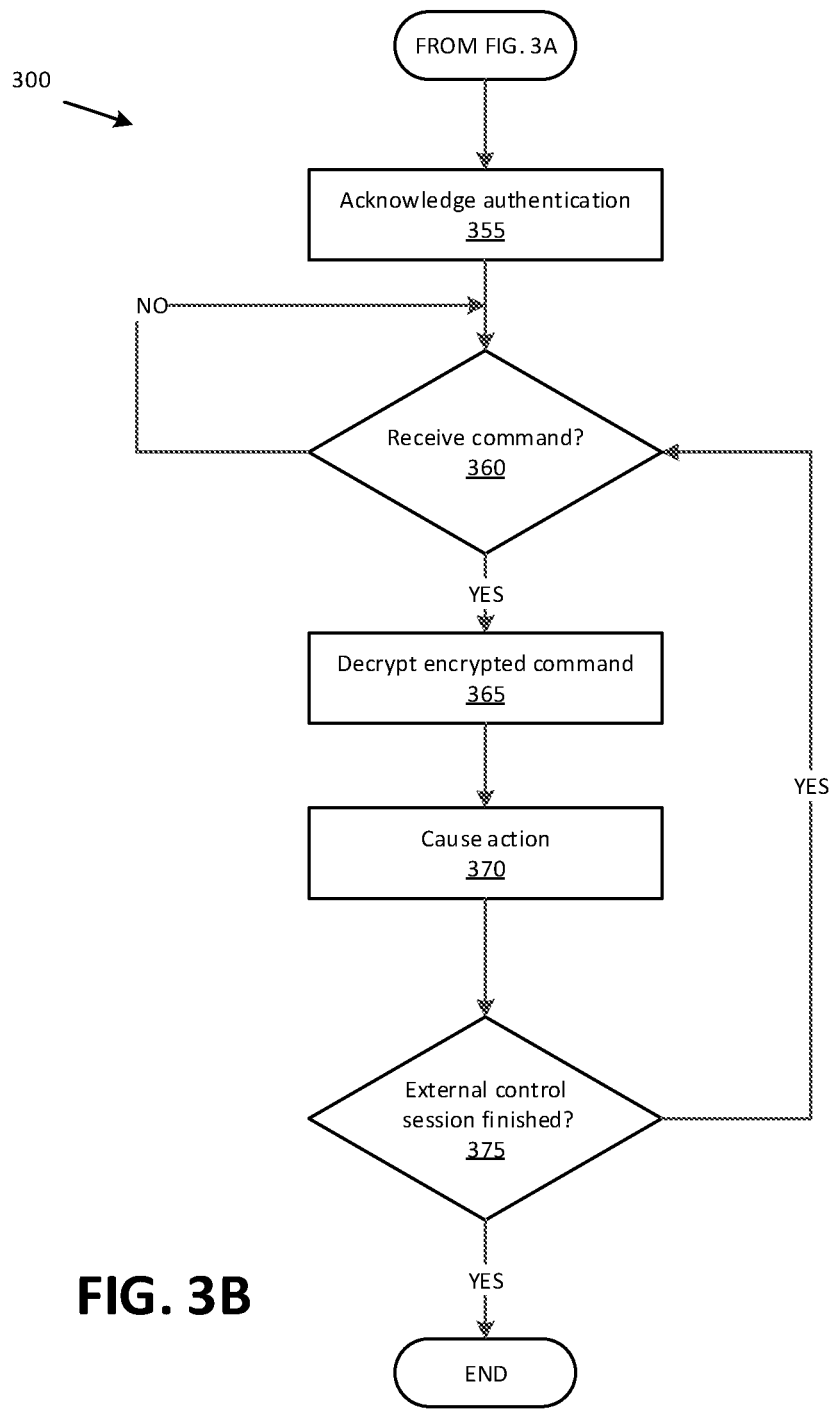

FIGS. 3A-3B include a flowchart of an exemplary process 300 for the vehicle 100 computer 110 authenticating a control computer 160, e.g., programmed according to the process 200. For example, a vehicle 100 computer 110 may be programmed to execute blocks of the process 300.

Referring to the FIG. 3A, the process 300 begins in a decision block 305, in which the vehicle 100 computer 110 determines whether the vehicle 100 computer 110 received an access code such as a password from a dealership, etc. For example, a user could input a password into a vehicle 100 user interface 140. If the vehicle 100 computer 110 determines that an access code was received, then the process 300 proceeds to a decision block 310; otherwise the process 300 returns to the decision block 305.

In the decision block 310, the vehicle 100 computer 110 determines whether the received access code matches an expected access code. For example, a list of expected access codes may be stored in a vehicle 100 computer 110 memory. If the vehicle 100 computer 110 determines that the received access code matches an expected access code, then the process 300 proceeds to a block 315; otherwise the process 300 returns to the decision block 305.

In the block 315, the vehicle 100 computer 110 sets a mode of vehicle 100 operation to a non-autonomous mode. Thus, advantageously the vehicle 100 computer 110 prevents an activation of the non-autonomous mode by an intruder computer. For example, in a case where an intruder fails to gain access to an interior of the vehicle 100, the intruder may fail to enter the expected access code via the user interface 140. Thus, an intruder computer that is connected to the vehicle 100 communication network, e.g., under a vehicle 100 hood, may fail to control the vehicle 100 operation.

Next, in a decision block 320, the vehicle 100 computer 110 determines whether an encrypted message is received from a control computer 160. For example, the message may include additional non-encrypted information indicating a sender identifier, a CAN message identifier associated with the control device 140. In other words, an identifier of a message may be a non-encrypted information which may indicate an identity of a sender. Thus, the vehicle 100 computer 110 may know which identity a sender of the received message claims to have. As discussed below, this may be useful to verify if the message is received from the sender that is indicated in the received message. If the vehicle 100 computer 110 determines that an encrypted message is received, the process 300 proceeds to a decision block 340; otherwise the process 300 returns to the decision block 300.

In the decision block 340, the vehicle 100 computer 110 determines whether a three-party authentication is used. For example, the vehicle 100 computer 110 may have data stored in a memory indicating whether three-party authentication is used. Additionally or alternatively, a remote computer 180 may configure, e.g., via a message sent to the vehicle 100 computer 110, whether three-party authentication is used. Additionally, the vehicle 100 computer 110 may send a message, e.g., periodically, to a control computer 160 connected to the vehicle 100 communication network indicating whether three-party authentication used. If the vehicle 100 computer 110 determines that three-party authentication is used, then the process 300 proceeds to a block 325; otherwise the process 300 proceeds to a decision block 345.

In the block 325, the vehicle 100 computer 110 sends a request to a remote computer 180 including data such as an identifier of the vehicle 100, an identifier of a control computer 160 requesting an authenticated communication, current time, etc.

Next, in a decision block 330, the vehicle 100 computer 110 determines whether data is received from the remote computer 180. For example, the received data may include data associated with a temporary authentication signature that the remote computer 180 separately provides to the control computer 160 (see FIG. 4). Additionally or alternatively, the vehicle 100 computer 110 may determine a decryption key and/or an authentication signature expected from the respective control computer 160 based at least in part on the received data. If the vehicle 100 computer 110 determines that the data is received from the remote computer 180, then the process 300 proceeds to the decision block 345; otherwise the process 300 returns to the decision block 330.

In the decision block 345, the vehicle 100 computer 110 determines whether the received message is authenticated. In other words, the vehicle 100 computer 110 determines whether the message is received from the known control device 150 and/or the control device 150 is a known device permitted to control the vehicle 100 operation. In one example, if the decision block 345 is reached from the decision block 340, the vehicle 100 computer 110 determines, based on the information known to the vehicle 100 computer 110 such as a list of valid authentication signatures, functions, identifier of the control device 150, etc., whether the received authentication signature is valid. In another example, if the decision block 345 is reached from the decision block 330, the vehicle 100 computer 110 determines based at least partially on the received data from the remote computer 180 whether the authentication signature of the received message is valid. If the vehicle 100 computer 110 determines that the authentication is valid, then the process 300 proceeds to a block 355 (see FIG. 3B); otherwise the process 300 proceeds to a block 350.

In the block 350, the vehicle 100 computer 110 declines the authentication request of the sender, e.g., by sending a message indicating that the sender has failed to send a message with a valid authentication signature. Following the block 350, the process 300 ends, or alternatively returns to the decision block 305, although not shown in FIG. 3A.

Turning now to FIG. 3B, in the block 355, the vehicle 100 computer 110 acknowledges the authentication of the control computer 160. For example, the vehicle 100 computer 110 sends a message to the control computer 160 acknowledging the authentication.

Next, in a decision block 360, the vehicle 100 computer 110 determines whether a command from the control computer 160 is received. In one example, the received command includes an encrypted message received via the vehicle 100 communication network. If the vehicle 100 computer 110 determines that a message is received from the control computer 160, then the process 300 proceeds to a block 365; otherwise the process 300 returns to the decision block 360.

In the block 365, the vehicle 100 computer 110 decrypts a command received from the control computer 160. Additionally, each received command from the control computer 160 may include an authentication signature and the vehicle 100 computer 110 may authenticate each received command from the control computer 160 individually.

Next, in a block 370, the vehicle 100 computer 110 causes an action based on the received command. For example, the vehicle 100 computer 110 may send a message to the vehicle 100 brake actuator including a requested brake pressure of 500 kPa.

Next, in a decision block 375, the vehicle 100 computer 110 determines whether a control session is ended, e.g., the control computer 160 is disconnected from the vehicle 100 communication network. If the vehicle 100 computer 110 determines that the control session is ended, then the process 300 ends; otherwise the process 300 returns to the decision block 360.

Figure 4:
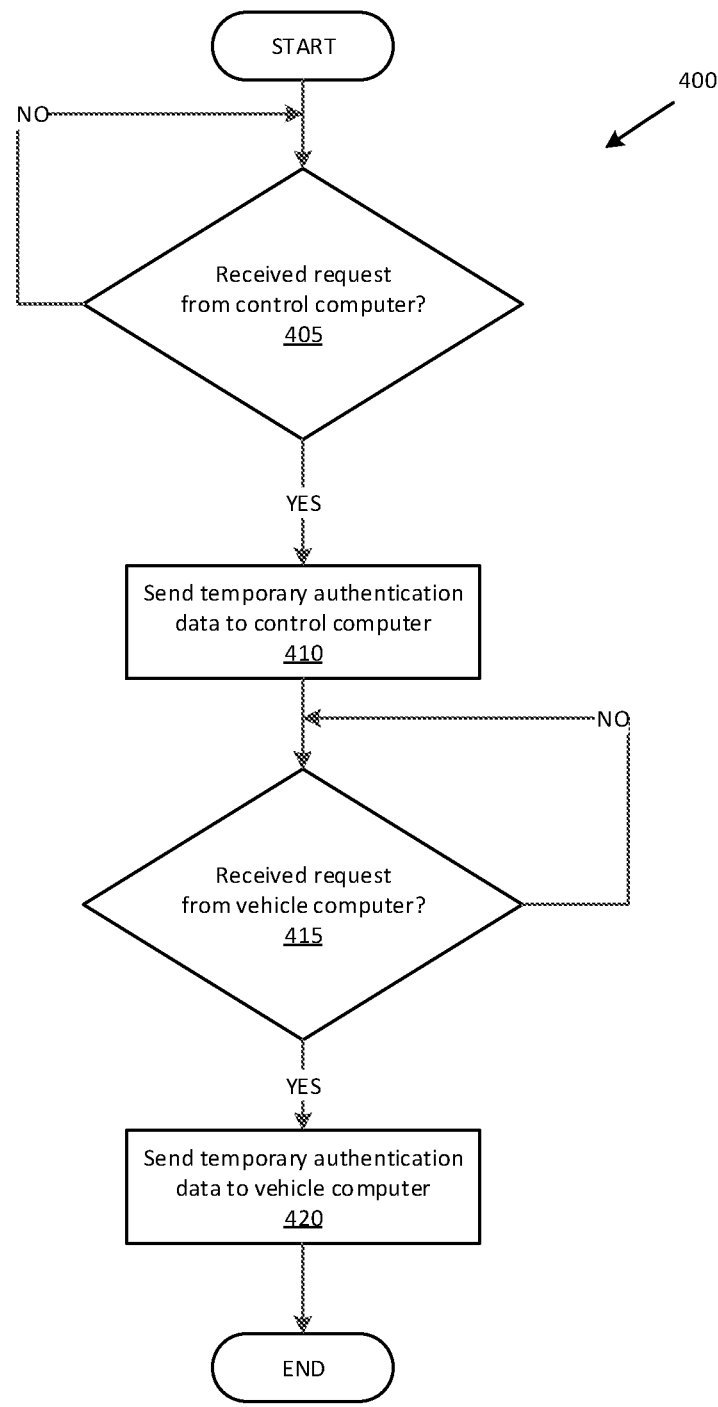
FIG. 4 is a flowchart of an exemplary process for a remote computer to provide authentication data.

FIG. 4 is a flowchart of an exemplary process 400 for a remote computer 180 providing authentication data to the control computer 160 and the vehicle 100 computer 110. For example, a remote computer 180 may be programmed to execute blocks of the process 400.

The process 400 begins in a decision block 405, in which the remote computer 180 determines whether a request, e.g., for temporary authentication data, is received from encrypted data is received from a control computer 160. The request may include a control computer 160 identifier, a vehicle 100 identifier, a key generated by the control device 150 encryption token 170, etc. If the remote computer 180 determines that a request from a control computer 160 is received, then the process 400 proceeds to a block 410; otherwise the process 400 returns to the decision block 405.

In the block 410, the remote computer 180 generates and sends temporary authentication data, e.g., a temporary authentication signature, to the control computer 160. In one example, the temporary authentication signature is generated based at least in part on one of a vehicle 100 identifier, a current time, and a control computer 160 identifier. Additionally, the remote computer 180 may send data including the temporary authentication signature to the identified vehicle 100 computer 110.

Next, in a decision block 415, the remote computer 180 determines whether a request is received from a vehicle 100 computer 110. Additionally or alternatively, the remote computer 180 may determine whether a request is received from a vehicle 100 computer 110 that is already identified in a previously received request from a control computer 160, e.g., based on the vehicle 100 identifier. If the remote computer 180 determines that a request is received from the vehicle 100 computer 110, then the process 400 proceeds to a block 420; otherwise the process 400 returns to the decision block 415.

In the block 420, the remote computer 180, determines and sends data to the vehicle 100 computer 110. In one example, the sent data includes the temporary authentication signature that has been also sent to the control computer 160. In another example, the sent data includes data such as a new key, a function, etc., that may be used by the vehicle 100 computer 110 to authenticate messages from the control computer 160 sent to the vehicle 100 computer 110. Additionally, the remote computer 180 may be programmed to send a message declining temporary authentication data for the requesting vehicle 100 computer 110 upon determining that the remote computer 180 has not received a request from a control computer 160 including an identifier of the vehicle 100. In other words, the remote computer 180 may decline providing temporary authentication data when lacks a previously received request from a control computer 160 indicating a start of a control session with the vehicle 100 computer 110.

Following the block 420, the process 400 ends, or alternatively returns to the decision block 405, although not shown in FIG. 4.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system comprising: a control computer and a vehicle computer,
wherein the control computer is programmed to:
establish a physical connection to a first network that is a communication network contained in a vehicle;
determine to perform an authentication between the control computer and the vehicle computer according to a three-party rather than a two-party authentication;
receive, at the control computer, a temporary authentication signature from a remote computer via a wireless protocol;
send the temporary authentication signature, received in the control computer from the remote computer, to the vehicle computer;
wherein the vehicle computer is programmed to:
determine to perform the authentication between the control computer and the vehicle computer according to three-party authentication with the control computer, the vehicle computer, and the remote computer, rather than two-party authentication;
in response to sending a request to the remote computer, receive, at the vehicle computer in response to the request, the temporary authentication signature from the remote computer, and perform the authentication between the control computer and the vehicle computer based on receiving the temporary authentication signature from the remote computer via the wireless protocol; and wherein the control computer is further programmed to, upon receiving an acknowledgement of the authentication from the vehicle computer, control vehicle operation including at least one of propulsion, braking, and steering.

2. The system of claim 1, wherein the temporary authentication signature is based at least in part on an encryption key.

3. The system of claim 1, further comprising the vehicle computer, programmed to authenticate the control computer by determining whether the authentication signature is valid based on data stored in the vehicle computer in addition to the temporary authentication signature from the remote computer.

4. The system of claim 2, wherein the control computer is further programmed to encrypt a message including the temporary authentication signature based on the encryption key.

5. The system of claim 4, wherein the vehicle computer is further programmed to decrypt the encrypted message based on a decryption key generated by the vehicle computer and authenticate the control computer based on the temporary authentication signature.

6. The system of claim 3, wherein the data stored in the vehicle computer about the vehicle includes one or more of a vehicle identification number, a current time, and a computer identifier.

7. The system of claim 1, wherein data received in the vehicle computer from the remote computer is encrypted with a public key provided by the vehicle computer.

8. The system of claim 1, wherein the control computer is further programmed to control the vehicle operation by sending a message including a command to actuate the at least one of propulsion, braking, and steering.

9. The system of claim 8, wherein the message is signed by the control computer.

10. The system of claim 1, wherein the vehicle computer is further programmed to:

receive, from a vehicle user interface, a request for activating a vehicle non-autonomous mode, wherein the request includes an access code;

activate the vehicle non-autonomous mode, upon determining that the access code matches an expected access code; and control the vehicle operation based on a message from the control computer upon determining that the vehicle computer is in the non-autonomous mode and the authentication by the vehicle computer.

11. The system of claim 1, wherein the vehicle computer is further programmed to receive data from the remote computer upon sending a request to the remote computer, including at least one of a vehicle identifier, a control computer identifier, and a current time.

12. The system of claim 4, wherein the message includes at least one of a generated key, a control computer identifier, and a vehicle identification number.

* * * * *